United States Patent
Danilov et al.

(10) Patent No.: US 10,564,883 B2
(45) Date of Patent: Feb. 18, 2020

(54) EFFICIENT MIGRATION TO DISTRIBUTED STORAGE

(71) Applicant: EMC IP Holding Company LLC, Hopkinton, MA (US)

(72) Inventors: Mikhail Danilov, Saint Petersburg (RU); Gregory Skripko, Saint Petersburg (RU); Nikita Gutsalov, Saint Petersburg (RU); Ivan Tchoub, Saint Petersburg (RU); Alexander Fedorov, Saint Petersburg (RU); Sergey Koyushev, Saint Petersburg (RU); Maria Gavrilova, Chusovoy (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/620,897

(22) Filed: Jun. 13, 2017

(65) Prior Publication Data
US 2018/0165034 A1    Jun. 14, 2018

(30) Foreign Application Priority Data

Dec. 13, 2016  (RU) ................................ 2016148857

(51) Int. Cl.
| | |
|---|---|
| G06F 3/06 | (2006.01) |
| G06F 16/31 | (2019.01) |
| G06F 16/182 | (2019.01) |
| G06F 11/10 | (2006.01) |

(52) U.S. Cl.
CPC ............ *G06F 3/0647* (2013.01); *G06F 3/061* (2013.01); *G06F 3/067* (2013.01); *G06F 11/1076* (2013.01); *G06F 16/182* (2019.01); *G06F 16/316* (2019.01)

(58) Field of Classification Search
CPC .. G06F 3/0647; G06F 3/067; G06F 17/30619; G06F 17/30194; G06F 16/182; G06F 16/316; G06F 3/061; G06F 11/1076
See application file for complete search history.

(56) References Cited

U.S. PATENT DOCUMENTS

| | | | |
|---|---|---|---|
| 6,070,003 A | 5/2000 | Gove et al. | |
| 6,550,035 B1 | 4/2003 | Okita | |
| 7,549,110 B2 | 6/2009 | Stek et al. | |
| 7,559,007 B1 | 7/2009 | Wilkie | |
| 7,581,156 B2 | 8/2009 | Manasse | |

(Continued)

OTHER PUBLICATIONS

U.S. Appl. No. 15/620,892, filed Jun. 13, 2017, Danilov et al.

(Continued)

*Primary Examiner* — David Yi
*Assistant Examiner* — Zubair Ahmed
(74) *Attorney, Agent, or Firm* — Daly, Crowley, Mofford & Durkee, LLP (57) ABSTRACT

A computer program product, system, and method for determining a list of objects, within source storage, to migrate; generating a chunk layout for the objects to migrate; and for each unencoded chunk within the chunk layout: retrieving objects from source storage specified by the unencoded chunk within the chunk layout; generating data and coded fragments for the unencoded chunk using the retrieved objects; and storing the data and coded fragments to primary storage.

18 Claims, 6 Drawing Sheets

(56) References Cited

U.S. PATENT DOCUMENTS

| | | | |
|---|---|---|---|
| 8,458,515 | B1 | 6/2013 | Saeed |
| 8,532,212 | B2 | 9/2013 | Ito |
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,914,706 | B2 | 12/2014 | Anderson |
| 9,753,807 | B1 | 9/2017 | Donlan et al. |
| 9,921,910 | B2 * | 3/2018 | Sangamkar ......... G06F 11/1076 |
| 2005/0038968 | A1 | 2/2005 | Iwamura et al. |
| 2006/0105724 | A1 | 5/2006 | Nakao |
| 2006/0147219 | A1 | 7/2006 | Yoshino et al. |
| 2006/0155946 | A1 | 7/2006 | Ji |
| 2008/0126357 | A1 | 5/2008 | Casanova et al. |
| 2009/0112953 | A1 | 4/2009 | Barsness et al. |
| 2010/0037056 | A1 | 2/2010 | Follis et al. |
| 2010/0091842 | A1 | 4/2010 | Ikeda et al. |
| 2010/0180176 | A1 | 7/2010 | Yosoku et al. |
| 2010/0246663 | A1 | 9/2010 | Citta et al. |
| 2011/0029840 | A1 | 2/2011 | Ozzie et al. |
| 2011/0053639 | A1 | 3/2011 | Etienne Suanez et al. |
| 2011/0055494 | A1 | 3/2011 | Roberts et al. |
| 2011/0184997 | A1 | 7/2011 | Grube et al. |
| 2011/0196900 | A1 | 8/2011 | Drobychev et al. |
| 2012/0047339 | A1 | 2/2012 | Decasper et al. |
| 2012/0051208 | A1 | 3/2012 | Li et al. |
| 2012/0060072 | A1 | 3/2012 | Simitci et al. |
| 2012/0106595 | A1 | 5/2012 | Bhattad et al. |
| 2013/0067187 | A1 | 3/2013 | Moss et al. |
| 2013/0159603 | A1 | 6/2013 | Whitney |
| 2014/0046997 | A1 | 2/2014 | Dain et al. |
| 2014/0201541 | A1 | 7/2014 | Paul et al. |
| 2014/0380125 | A1 | 12/2014 | Calder et al. |
| 2015/0106578 | A1 * | 4/2015 | Warfield ............... G06F 3/0613 711/158 |
| 2015/0378626 | A1 * | 12/2015 | Motwani ................ G06F 3/067 711/114 |
| 2016/0092109 | A1 | 3/2016 | Wu et al. |
| 2016/0239384 | A1 | 8/2016 | Slik et al. |
| 2016/0246677 | A1 | 8/2016 | Sangamkar et al. |
| 2017/0046127 | A1 | 2/2017 | Fletcher et al. |
| 2017/0075947 | A1 | 3/2017 | Kurilov et al. |
| 2017/0083549 | A1 | 3/2017 | Danilov et al. |
| 2017/0242732 | A1 | 8/2017 | Vairavanathan et al. |
| 2017/0277915 | A1 | 9/2017 | Slik |
| 2017/0286436 | A1 * | 10/2017 | Neporada ......... G06F 17/30073 |

OTHER PUBLICATIONS

U.S. Appl. No. 15/620,898, filed Jun. 13, 2017, Danilov et al.
U.S. Appl. No. 15/620,900, filed Jun. 13, 2017, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Non-Final Office Action dated Feb. 2, 2018 for U.S. Appl. No. 15/398,826; 16 Pages.
Final Office Action dated Jun. 19, 2018 for U.S. Appl. No. 15/398,826; 8 pages.
Response to U.S. Non-Final Office Action dated Dec. 14, 2017 for U.S. Appl. No. 15/281,172; Response Filed on Apr. 9, 2018; 12 pages.
Anvin, "The mathematics of RAID-6;" Zytor; Dec. 20, 2011; 9 Pages.
Blomer et al.; "An XOR-Based Erasure-Resilient Coding Scheme;" International Computer Science Institute, Berkley, California; 1995; 19 Pages.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Non-Final Office Action dated Jun. 18, 2018 for U.S. Appl. No. 15/398,819; 8 Pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
Notice of Allowance dated Jul. 13, 2018 for U.S. Appl. No. 15/281,172; 13 Pages.
Response to Non-Final Office Action dated Jun. 18, 2018, for U.S. Appl. No. 15/398,819; Response filed on Sep. 17, 2018; 10 Pages.
Notice of Allowance dated Oct. 16, 2018 for U.S. Appl. No. 15/398,826; 10 Pages.
RCE and Response to Final Office Action dated Jun. 19, 2018 for U.S. Appl. No. 15/398,826, filed Aug. 23, 2018; 11 Pages.

* cited by examiner

EFFICIENT MIGRATION TO DISTRIBUTED STORAGE

CROSS REFERENCE TO RELATED APPLICATIONS

This application claims priority to Russian Patent Application number 2016148857, filed Dec. 13, 2016, and entitled "EFFICIENT MIGRATION TO DISTRIBUTED STORAGE," which is incorporated herein by reference in its entirety.

BACKGROUND

Distributed storage systems may provide a wide range of storage services, while achieving high scalability, availability, and serviceability. An example of a distributed storage system is Elastic Cloud Storage (ECS) from Dell EMC of Hopkinton, Mass. Distributed storage systems may employ erasure coding or another data protection scheme to protect against data loss.

Some distributed storage systems may provide data migration solutions to facilitate transferring data between two or more data storages (e.g., to move legacy data to a new storage system). Many existing storage systems use a "push" migration mode, wherein a host reads data from one storage system (referred to as "source storage") and writes/pushes data to a second storage system (referred to as "target storage") using standard user I/O facilities of the target storage.

SUMMARY

It is appreciated herein that, in existing systems, data migration may be inefficient due to overhead from a data protection scheme. In particular, writing migration data to target storage using standard user I/O facilities may invoke intermediate data protection processing that may not be essential in the context of data migration.

In accordance with one aspect of the disclosure, a method comprises: determining a list of objects within source storage to migrate; generating a chunk layout for the objects to migrate; and for each unencoded chunk within the chunk layout: retrieving objects from source storage specified by the unencoded chunk within the chunk layout; generating data and coded fragments for the unencoded chunk using the retrieved objects; and storing the data and coded fragments to primary storage.

In some embodiments, determining the list of objects within source storage to migrate includes querying the source storage. In certain embodiments, querying the source storage includes retrieving a list of object sizes from source storage. In particular embodiments, generating the chunk layout includes placing related objects within contiguous chunk segments and/or within contiguous chunks. In many embodiments, generating data and coded fragments for each unencoded chunk within the chunk layout includes generating data and coded fragments in parallel across multiple nodes of distributed storage system.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the term "storage system" encompass, for example, private or public cloud computing systems for storing data as well as systems for storing data comprising virtual infrastructure and those not comprising virtual infrastructure. As used herein, the terms "client" and "user" may refer to any person, system, or other entity that uses a storage system to read/write data. The term "I/O request" or simply "I/O" may be used herein to refer to a request to read or write data.

As used herein, the term "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" may also refer to a storage array comprising one or more storage devices.

Figure 1:
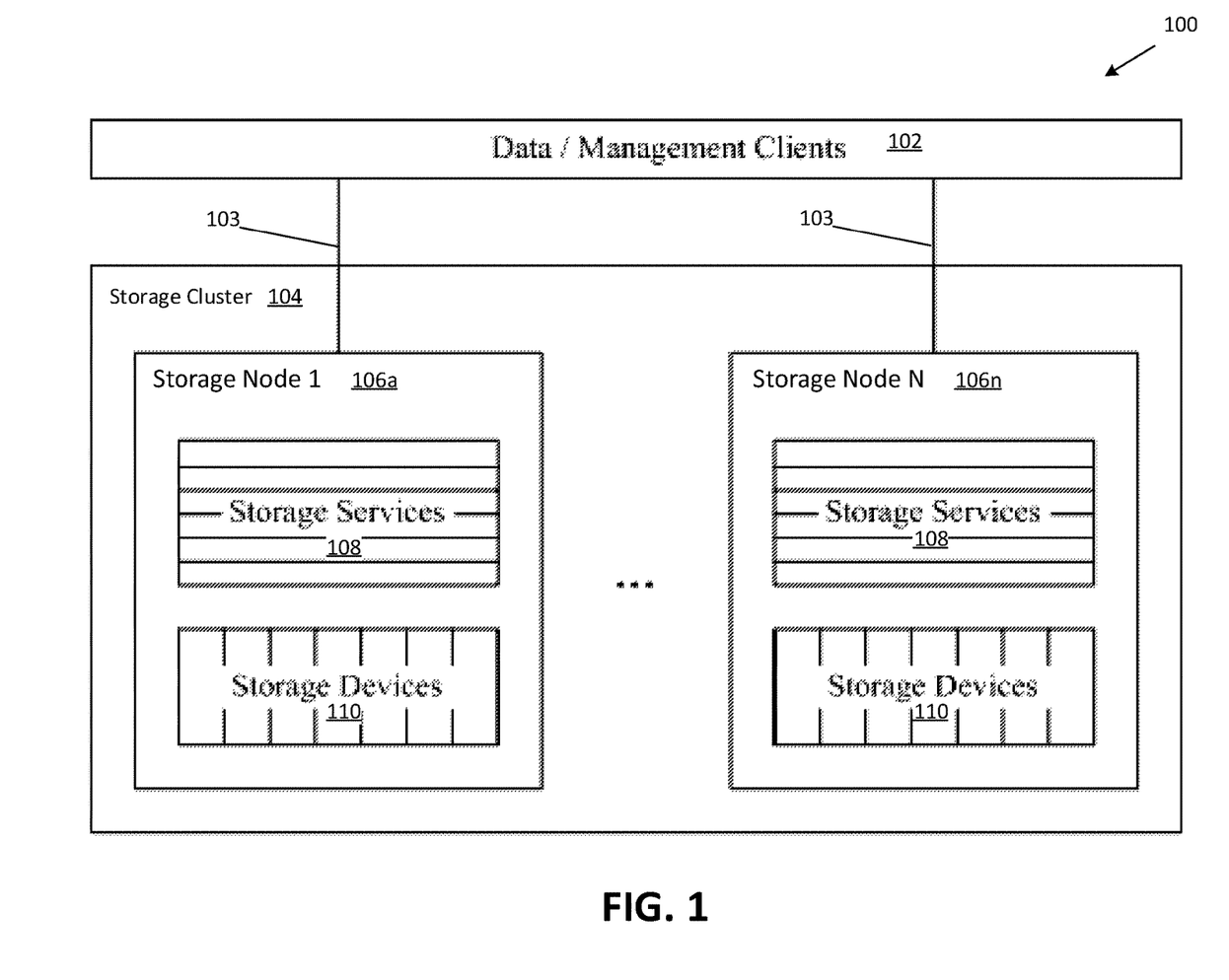
FIG. 1 is a block diagram of a distributed storage system, in accordance with an embodiment of the disclosure.

FIG. 1 shows a distributed storage system 100, in accordance with an embodiment of the disclosure. The distributed storage system 100 may include one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems.

The storage cluster 104 includes one or more storage nodes 106a . . . 106n (generally denoted 106). A storage node 106 may include one or more services 108 and one or more storage devices 110, as shown. In some embodiments, a storage node 106 may include the following services 108: an authentication service to authenticate requests from clients 102; storage API services to parse and interpret requests from clients 102; a storage chunk management service to facilitate storage chunk allocation/reclamation for different storage system needs and monitor storage chunk health and usage; a storage server management service to manage available storage devices capacity and to track storage devices states; and a storage server service to interface with the storage devices 110.

In particular embodiments, the distributed storage system 100 may use erasure coding to protect against data loss. In certain embodiments, storage node services 108 may include a migration service to efficiently migrate data into a storage system 100 that utilizes erasure coding. In some embodiments, the migration service performs at least a portion of the processing described below in conjunction with FIGS. 3 and 4.

In many embodiments, a storage node 106 may include a processor and a non-volatile memory storing computer program code that when executed on the processor causes the processor to execute processes operable to perform functions of the services 108.

Storage devices 110 comprise one or more physical and/or logical storage devices attached to a storage node 106. In certain embodiments, storage devices 110 may be provided as a storage array. In particular embodiments, storage devices 110 may be provided as VNX or Symmetrix VMAX, which are available from Dell EMC of Hopkinton, Mass.

In general operation, a client 102 may send an I/O request to the storage cluster 104. The request may be received by any available storage node 106. The receiving node 106 may process the request locally and/or may delegate request processing to one or more other nodes 106 (referred to herein as its "peer nodes"). In some embodiments, client data may be split into fixed size pieces (referred to herein as "chunks") for storage within the cluster 104. In some embodiments, padding can be added to a chunk to ensure that all chunks are of equal size. In certain embodiments, each chunk may be 128 Mb in size.

In some embodiments, a distributed storage system 100 may be an Elastic Cloud Storage (ECS) system from Dell EMC of Hopkinton, Mass.

Figure 2:
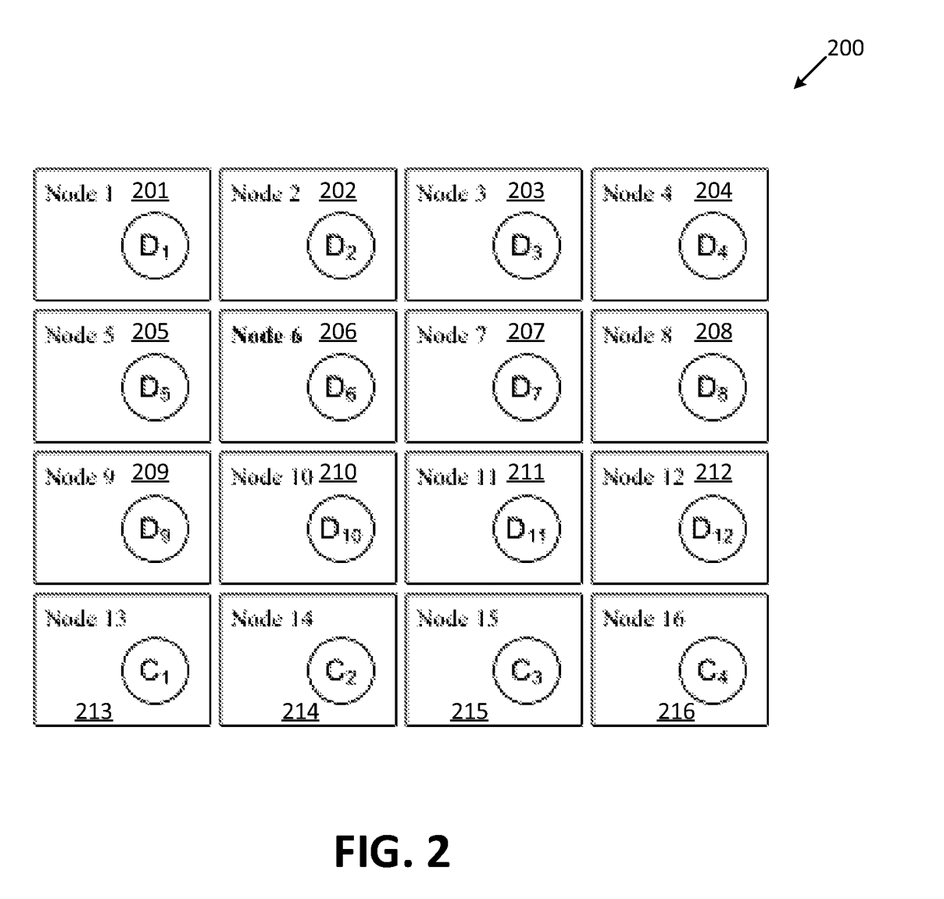
FIG. 2 is a diagram illustrating data protection within a distributed storage system, in accordance with an embodiment of the disclosure.

FIG. 2 illustrates how a distributed storage system 200 can use erasure coding to protect against data loss, according to embodiments of the disclosure. In various embodiments, a chunk of data to be stored (D) may split the data into k data fragments $D_1, D_2, \ldots, D_k$ and, using coding techniques described herein below, m coded fragments $C_1, C_2, \ldots, C_m$ may be generated from the k fragments. In some embodiments, the coded fragments encode information that can be used to restore data fragments and, thus, may be considered "redundant." In some embodiments, the storage system 200 can use a coding scheme that allows it to tolerate the loss of any m data fragments. In the embodiment of FIG. 2, k=12 and m=4, although other values of k and m can be used.

In certain embodiments, the data and coded fragments may be generated using techniques described in co-owned U.S. patent application Ser. No. 15/193,407, filed on Jun. 27, 2016 and entitled ERASURE CODING FOR ELASTIC CLOUD STORAGE, which is herein incorporated by reference in its entirety.

As shown in FIG. 2, the data fragments $D_1, D_2, \ldots, D_k$ and coded fragments $C_1, C_2, \ldots, C_m$ may be stored across several nodes of the storage system 200. In the illustrative embodiment, the storage system 200 includes sixteen (16) nodes 201-216, with each node 201-216 storing exactly one data fragment or coded fragment. In other embodiments, a given node 201-216 may store multiple data fragments and/or multiple coded fragments (e.g., if k+m is greater than the number of available nodes). In yet other embodiments, some nodes may not store any data fragments or coded fragments (e.g., if k+m is less than the number of available nodes). In some embodiments, a node 201-216 may be the same or similar to a node 106 described above in conjunction with FIG. 1.

When a client writes data D to the cluster, the data D may be split into k equal size data fragments $D_1, D_2, \ldots, D_k$, with padding or other data complement being added as needed to ensure the data fragments are of equal size. In some embodiments, if a data fragment $D_1, D_2, \ldots, D_k$ is lost (e.g., due to a node failure, a storage device failure, or data corruption), the lost data fragment may be regenerated using available data fragments $D_1, D_2, \ldots, D_k$, and redundant information within available coded fragments $C_1, C_2, \ldots, C_m$. In certain embodiments, at least k unique available fragments—either data fragments or coded fragments—may be required to decode a lost data fragment. Thus, according to some embodiments, the system 200 can tolerate the loss of any fragments.

In many embodiments, the storage system 200 uses a delayed erasure coding process, while providing "intermediate" data protection between the time the data is initially stored and the time erasure coding completes. In particular, the storage system 200 may store multiple copies of the data D before sending an acknowledgement to the client. In one embodiment, the system 200 stores three (3) copies of the data D before sending an acknowledgement. In some embodiments, each copy of the data D is stored on a separate node 201-216. After the client is acknowledged, a designated (or "owner") node enqueues a local erasure coding task to perform erasure encoding on the data D as describe above. After the erasure coding task completes, the copies of data D may be deleted.

Figure 3:
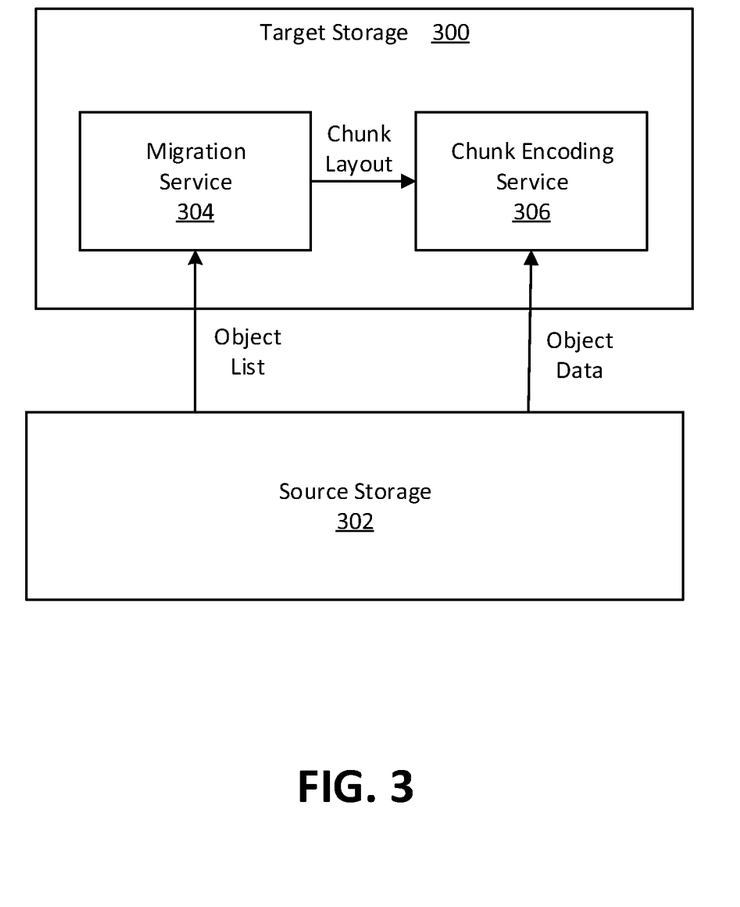
FIG. 3 is a block diagram of a data storage system having a migration service, in accordance with an embodiment of the disclosure.

Referring to FIG. 3, in some embodiments, a distributed storage system may use an alternate erasure coding process when data is being migrated into it. In the example shown, data may be migrated from a source storage system 302 to a target storage system 300. The target storage system 300 may be a distributed storage system that is the same as or similar to storage system 100 of FIG. 1 and/or storage system 200 of FIG. 2. The target storage system 300 may include one or more services, including a migration service 304 and a chunk encoding service 306, as shown.

The migration service 304 may be configured to perform "pull migration" against data source storage 302. In particular, the migration service 304 reads data from source storage 302 and writes it to target storage 300 using one or more internal services of the target storage. It is appreciated herein that some or all of the "intermediate" data protection scheme described above may be unnecessary for migrated data because the data being migrated may already be protected by source storage 302 and because access to the new data within target storage 300 can be controlled.

In various embodiments, target storage 300 and/or source storage 302 may be provided as object stores, meaning that user data is stored in arbitrary-sized blobs referred to as "objects." In some embodiments, the migration service 304 determines a list of objects to be migrated from source storage 302, generates a so-called "chunk layout" for the objects, and then requests that encoding be performed for one or more chunks defined by the chunk layout. In certain embodiments, the migration service sends encoding requests to a chunk encoding service (e.g., service 306 in FIG. 3), which in turn retrieves (or "pulls") corresponding object data, performs erasure coding on the retrieved object data, and stores data and coded fragments to target storage 300.

Figure 3A:
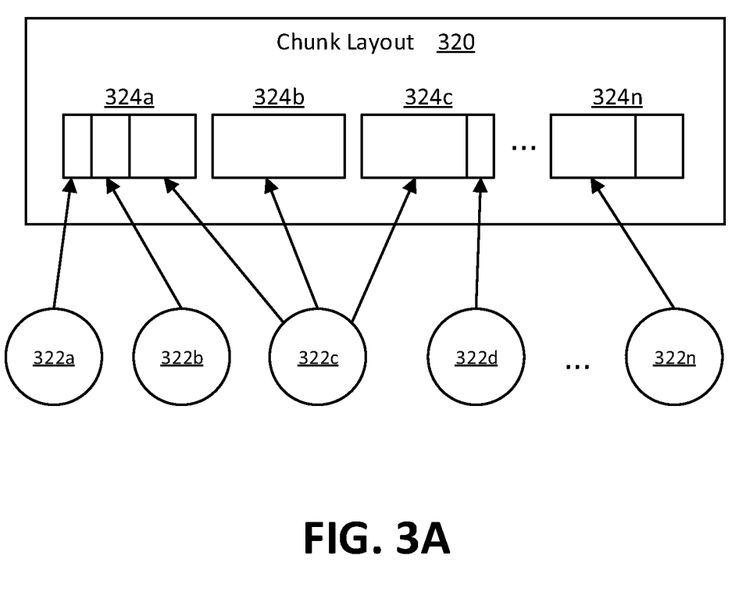
FIG. 3A is a diagram of an illustrative chunk layout, in accordance with an embodiment of the disclosure.

FIG. 3A illustrates a chunk layout 320 that may be generated for a list of objects 322a-322n (322 generally) to be migrated from source storage. The chunk layout 320 includes a plurality of chunks 324a-324n (324 generally). In many embodiments, each chunk 324 may have a fixed size (e.g., 128 Mb). In some embodiments, a given chunk may store data for multiple objects. For example, in FIG. 3A, chunk 324a may store data for objects 322a, 322b, and 322c. Conversely, in some embodiments, a single object may be stored across multiple chunks. For example, object 322c is shown as being stored in chunks 324a, 324b, and 324c.

In certain embodiments, a migration service (e.g., migration service 304 in FIG. 3) may generate the chunk layout 320 based on information queried from the source storage system, before any objects are actually migrated from source to target storage. In many embodiments, the migration service seeks to place an object 322 within a continuous chunk segment. In certain embodiments, the migration service seeks to place related objects within contiguous chunk segments and/or within contiguous chunks. For example, referring to FIG. 3A, if objects 322a and 322b are related (e.g., they are located within the same bucket or have some other known relationship), the migration service may seek to locate these objects within continuous regions of a chunk 324a, as shown. In many embodiments, at least a portion of a chunk layout 320 may be generated before erasure encoding commences on migrated data.

Figure 4:
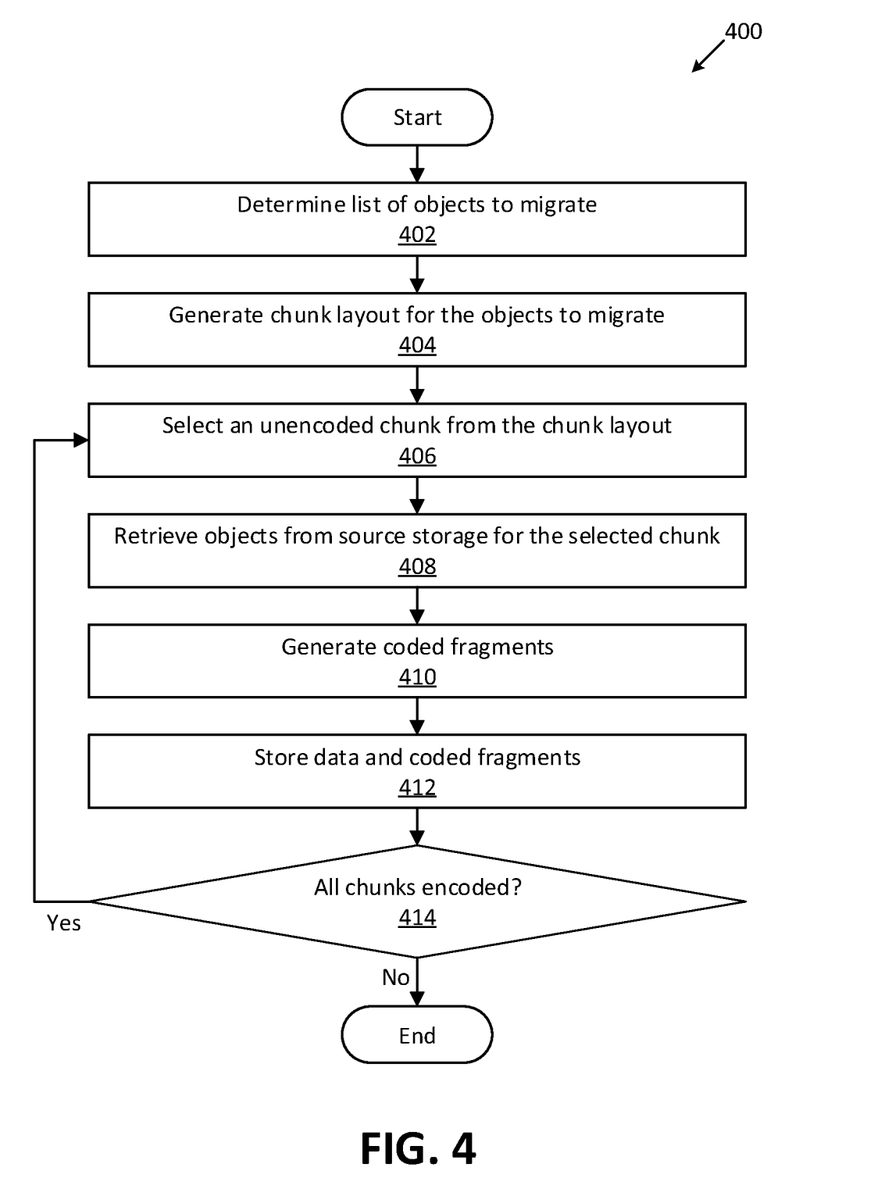
FIG. 4 is a flow diagram illustrating processing that may occur within a storage system node, in accordance with embodiments.

FIG. 4 is a flow diagram showing illustrative processing that can be implemented within a target storage system (e.g., target storage 300 in FIG. 3). In some embodiments, the processing may be implemented within a migration service (e.g., service 304 in FIG. 3) and/or a chunk encoding service (e.g., service 306 in FIG. 3) of one or more nodes of a distributed storage system. Rectangular elements (typified by element 402), herein denoted "processing blocks," represent computer software instructions or groups of instructions. Diamond shaped elements (typified by element 414), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In some embodiments, the processing and decision blocks represent states and transitions, respectively, within a finite-state machine, which can be implemented in software and/or hardware.

Referring to FIG. 4, a process 400 begins at block 402, where a list of objects to be migrated from source storage (e.g., source storage 302 in FIG. 3) to target storage (target storage 300 in FIG. 3) is determined. In some embodiments, the list of objects may be determined by querying source storage. In most embodiments, the list of objects includes an object size for each object to be migrated.

Referring again to FIG. 4, at block 404, a chunk layout may be generated for the list of objects to migrate. In some embodiments, block 404 places an object within a continuous chunk segment. In certain embodiments, block 404 places related objects within contiguous chunk segments and/or within contiguous chunks. In many embodiments, once the chunk layout has been determined, chunks defined by the layout may be encoded in an iterative manner, as described next. In certain embodiments, no memory or storage capacity is allocated for a chunk defined by the chunk layout until such time as that chunk is encoded.

Referring back to FIG. 4, at block 406, an unencoded chunk may be selected from the chunk layout. At block 408, the objects specified for the selected chunk may be retrieved from source storage. At block 410, data and coded fragments may be generated from the retrieved object data using, for example, techniques described above in conjunction with FIG. 2. At block 412, the data and coded fragments may be stored across one or more nodes of the target storage system. In many embodiments, blocks 406-412 may be repeated until all chunks defined by the chunk layout are encoded and stored within target storage (block 414).

In various embodiments, the process 400 may be executed in a distributed, parallel manner across multiple nodes of the target storage system. In some embodiments, each node may execute one or more control threads to perform the processing described hereinabove.

In some embodiments, the so-called "pull migration" scheme described herein can reduce network and/or I/O traffic within a target storage system. In certain embodiments, migrated objects may have greater spatial locality within the target storage, reducing the amount of system metadata required to track the objects and increasing object read performance. In various embodiments, pull migration can improve garbage collection performance within target storage because related objects will tend to be stored in the same or contiguous chunks.

Figure 5:
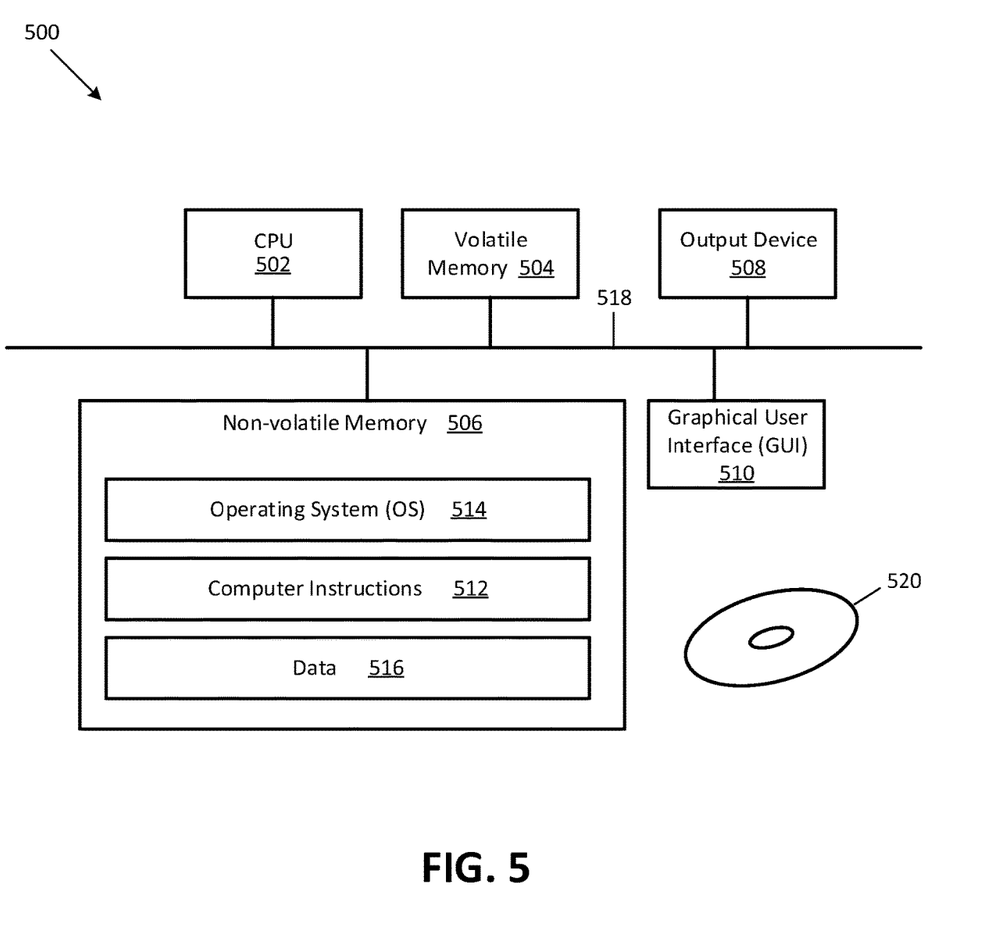
FIG. 5 is block diagram of a computer on which the processing of FIG. 4 may be implemented, according to an embodiment of the disclosure.

FIG. 5 shows an illustrative computer 500 that can perform at least part of the processing described herein, according to an embodiment of the disclosure. The computer 500 may include a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one example, the computer instructions 512 are executed by the processor 502 out of volatile memory 504. In some embodiments, the computer 500 corresponds to a virtual machine (VM). In other embodiments, the computer 500 corresponds to a physical computer.

In some embodiments, a non-transitory computer readable medium 520 may be provided on which a computer program product may be tangibly embodied. The non-transitory computer-readable medium 520 may store program instructions that are executable to perform the processing of FIG. 4.

Referring again to FIG. 5, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for migrating objects to a distributed storage system, comprising:
    determining, by a migration service implemented at a target storage of the distributed storage system, a list of objects within a source storage to migrate to the target storage;
    performing pull migration, by the migration service of the target storage against the source storage, for objects in the list of objects, the pull migration comprising:
        querying the source storage to determine relationships among the list of objects to migrate;
        generating a chunk layout for the objects to migrate based on the relationships, the generating including placing related objects, responsive to the querying, within contiguous chunk segments and/or within contiguous chunks; and
        for each unencoded chunk within the chunk layout:
            retrieving objects from source storage specified by the unencoded chunk within the chunk layout;
            generating, by a chunk encoding service at the target storage, data and coded fragments for the unencoded chunk using the retrieved objects; and
            storing the data and coded fragments to primary storage at the target storage.

2. The method of claim 1 wherein determining the list of objects within source storage to migrate includes querying the source storage for object sizes of the objects.

3. The method of claim 1 wherein generating data and coded fragments for each unencoded chunk within the chunk layout includes generating data and coded fragments in parallel across multiple nodes of the distributed storage system.

4. The method of claim 1, wherein the unencoded chunks of the chunk layout are each of a fixed size.

5. The method of claim 4, wherein one chunk stores data for multiple objects and a single object is stored across multiple chunks.

6. The method of claim 1 wherein the chunk layout is generated before encoding begins on migrated data.

7. The method of claim 1, wherein no memory is allocated for a chunk defined by the chunk layout until corresponding data for allocation to the chunk is encoded.

8. The method of claim 1, wherein retrieving objects from source storage specified by the unencoded chunk within the chunk layout, generating the data and coded fragments for the unencoded chunk using the retrieved objects, and storing the data and coded fragments to primary storage at the target storage are implemented between a time the data is initially stored at the source storage and a time of completion of the coding, wherein the pull migration is performed absent an intermediate data protection scheme.

9. The method of claim 1, wherein pull migration is implemented absent performing an intermediate data protection scheme.

10. The method of claim 1, wherein the related objects include objects that are from a same bucket.

11. The method of claim 1, wherein generating the data and coded fragments includes dividing the data into k fixed size data fragments and generating m coded fragments from the k fixed size data fragments, wherein k is different from m.

12. The method of claim 11, further comprising:
    upon determining k+m>available number of nodes in the distributed storage system, storing at an available one of the nodes, multiple k data fragments and/or multiple m coded fragments.

13. A system for migrating objects to a distributed storage system, comprising:
    a processor at a target storage of the distributed storage system;
    a volatile memory; and
    a non-volatile memory storing computer program code that when executed on the processor causes the processor to execute a process operable to perform the operations of:

determining, by a migration service implemented at the target storage, a list of objects within a source storage to migrate to the target storage;

performing pull migration, by the migration service of the target storage against the source storage, for objects in the list of objects, the pull migration comprising:

querying the source storage to determine relationships among the list of objects to migrate;

generating a chunk layout for the objects to migrate based on the relationships, the generating including placing related objects, responsive to the querying, within contiguous chunk segments and/or within contiguous chunks; and for each unencoded chunk within the chunk layout:

retrieving objects from source storage specified by the unencoded chunk within the chunk layout;

generating, by a chunk encoding service at the target storage, data and coded fragments for the unencoded chunk using the retrieved objects; and storing the data and coded fragments to primary storage at the target storage.

14. The system of claim 13 wherein determining the list of objects within source storage to migrate includes querying the source storage for object sizes of the objects.

15. The system of claim 13 wherein generating data and coded fragments for each unencoded chunk within the chunk layout includes generating data and coded fragments in parallel across multiple nodes of the distributed storage system.

16. A computer program product tangibly embodied in a non-transitory computer-readable medium, the computer-readable medium storing program instructions for migrating objects to a distributed storage system, the instructions are executable to:

determine, by a migration service implemented at a target storage of the distributed storage system, a list of objects within a source storage to migrate to the target storage;

perform pull migration, by the migration service of the target storage against the source storage, for objects in the list of objects, the pull migration comprising:

querying the source storage to determine relationships among the list of objects to migrate;

generating a chunk layout for the objects to migrate based on the relationships, the generating including placing related objects, responsive to the querying, within contiguous chunk segment and/or within contiguous chunks; and for each unencoded chunk within the chunk layout:

retrieving objects from source storage specified by the unencoded chunk within the chunk layout;

generate, by a chunk encoding service at the target storage, data and coded fragments for the unencoded chunk using the retrieved objects; and storing the data and coded fragments to primary storage at the target storage.

17. The computer program product of claim 16 wherein determining the list of objects within source storage to migrate includes querying the source storage for object sizes of the objects.

18. The computer program product of claim 16 wherein generating data and coded fragments for each unencoded chunk within the chunk layout includes generating data and coded fragments in parallel across multiple nodes of the distributed storage system.

* * * * *